United States Patent
Adams et al.

(10) Patent No.: US 8,045,753 B2
(45) Date of Patent: Oct. 25, 2011

(54) METHOD OF AND SYSTEM FOR AUTHENTICATING AN ITEM

(75) Inventors: Guy Adams, Stroud Glos (GB); Stephen Pollard, Dursley (GB)

(73) Assignee: Hewlett-Packard Development Company, L. P., Houston, TX (US)

( * ) Notice: Subject to any disclaimer, the term of this patent is extended or adjusted under 35 U.S.C. 154(b) by 978 days.

(21) Appl. No.: 11/959,848

(22) Filed: Dec. 19, 2007

(65) Prior Publication Data
US 2008/0181447 A1   Jul. 31, 2008

(30) Foreign Application Priority Data
Jan. 25, 2007   (GB) ................... 0701398.0

(51) Int. Cl.
*G06K 9/00*   (2006.01)
*H04N 7/167*   (2011.01)

(52) U.S. Cl. .................. 382/100; 382/275; 380/201

(58) Field of Classification Search .................. 382/100, 382/103, 112, 113, 114, 115, 116, 135, 136, 382/137, 138, 130, 140, 155, 168, 173, 181, 382/220, 232, 235, 274, 276, 294, 305, 312, 382/275; 345/173; 235/454; 380/201
See application file for complete search history.

(56) References Cited

U.S. PATENT DOCUMENTS

| | | | |
|---|---|---|---|
| 6,193,156 B1 * | 2/2001 | Han et al. | 235/454 |
| 6,456,729 B1 * | 9/2002 | Moore | 382/103 |
| 7,353,994 B2 * | 4/2008 | Farrall et al. | 235/454 |
| 7,609,872 B2 * | 10/2009 | Plutchak et al. | 382/137 |
| 2005/0093829 A1 * | 5/2005 | Shaked et al. | 345/173 |
| 2005/0234857 A1 | 10/2005 | Plutchak et al. | |

FOREIGN PATENT DOCUMENTS

GB   2 422 699 A   8/2006

* cited by examiner

Primary Examiner — Seyed Azarian (57) ABSTRACT

A method of authenticating the identity of an item bearing or associated with a printed security marker, the method comprising:
a. printing the security marker with a pattern that encodes at least one of a unique product identifier, a batch identifier, and positional information about a portion of the marker;
b. scanning and storing an image of the security marker as printed, said image being taken at sufficiently high resolution to capture artifacts of the printing process;
and authentication steps comprising:
c. imaging a portion of the marker at sufficiently high resolution to capture the artifacts, and
d. querying a data store by providing the image of the portion of the marker or a compressed or parameterized version of the image and data derived from the pattern.

22 Claims, 5 Drawing Sheets

METHOD OF AND SYSTEM FOR AUTHENTICATING AN ITEM

FIELD OF THE INVENTION

The present invention relates to a method of apparatus for authenticating an item.

CROSS REFERENCE TO RELATED APPLICATIONS

The application claims priority from GB 0701398.0 filed on 25 Jan. 2007, the teachings of which are incorporated by reference.

BACKGROUND OF THE INVENTION

It is known that many products are subjected to counterfeiting. It is estimated that as of 2006 counterfeit products may represent 7% or so of the articles for sale in certain industries, such as pharmaceutical, fashion and the computer industry. Attempts to overcome counterfeiting include holographic labels but these themselves may be faked and are expensive to produce.

SUMMARY OF THE INVENTION

According to a first aspect of the present invention there is provided a method of authenticating the identity of an item bearing or associated with a printed security marker, the method comprising:
a. printing the security marker with a pattern that encodes at least one of a unique product identifier, a batch identifier, and positional information about a portion of the marker;
b. scanning and storing an image of the security marker as printed, said image being taken at sufficiently high resolution to capture artefacts of the printing process;
and authentication steps comprising:
c. imaging a portion of the marker at sufficiently high resolution to capture the artefacts, and
d. querying a data store by providing the image of the portion of the marker or a compressed or parameterised version of the image and data derived from the pattern.

According to a second aspect of the present invention there is provided a method of authenticating an item where the item has been printed with a security marker comprising a pattern that encodes positional information so as to identify one sub-portion of the marker from other parts of the marker, and which also encodes an identifier, and wherein the marker is read by a reader which captures an image of a portion of the marker, the data from the reader is processed to extract the identifier and the positional information, and a data store is interrogated to check the integrity of the marker.

According to a third aspect of the present invention there is provided an authentication system comprising a reader and a database or data store, wherein the reader images a portion of a security marker, the portion of the security marker containing spatially encoded data enabling the portion of the marker to be identified and an identity encoded within the marker to be identified, and wherein data from the image is presented to a database or data store which compares the data from the reader with data in the database or data store so as to give an indication about the authenticity of the security marker.

BRIEF DESCRIPTION OF THE DRAWINGS

The present invention will be described, by way of non-limiting example only, with reference to the accompanying drawings which.

DESCRIPTION OF PREFERRED EMBODIMENTS

Any security system applied to a product necessarily incurs some extra cost in the manufacturing of that product. Prior art security systems, such as physical attachment of holographic patches provide some security to a product, albeit at increased costs in the manufacturing process. The inventors noted that nearly all, if not all, products tend to come with printed items either in the product packaging or with printed areas of the product itself. As a consequence use of printing technology provides a potentially low cost solution to authenticating the source for a product.

It is already known to print information bearing items such as "unique" serial numbers onto products or to include security data in barcodes. However, these security features are to a large extent illusionary as a counterfeiter can reuse a real "unique" identifier. The inventors realised that to provide a good level of security, a security system should have a security marker which is difficult or expensive to counterfeit and should also include a lookup system such that the existence of duplicate security markers can be quickly detected and a warning given to users, distributors and/or manufacturers of the potential counterfeiting or security breach.

The inventors realised that in order for a query and authentication system using a data store, such as a database, to be workable the query overhead in terms of time and cost has to be relatively small. Where the database is remotely situated and communication occurs over telecommunication systems then this means that the size of the data packet sent to the database must not be too big, and that the database search needs to be constrained such that a response can be achieved relatively quickly. However, some of these constraints are in opposition with the need to make the security marker difficult, if not impossible, to forge.

One way to make forging a marker difficult is to make it relatively large and detailed. As a consequence, care has to be taken to reproduce in great detail the characteristics of a security marker, and it has to be done over a relatively large area. However, the use of large markers would ordinarily be expected to require a large imaging and data transfer process.

The inventors have realised that a security marker could be provided by encoding digital data into the security marker and that the digital data could also encode positional data that would enable a reader device to image only a portion of the security marker but to be able to determine which portion of the marker it was imaging. The portion could be chosen at random and hence the entirety of the security marker would provide security features. However, the need to only image a portion of it would reduce the data transfer requirement whilst the fact that the marker would be physically bigger and that any portion of it could be imaged at a checking station would maintain the need for a forger to replicate the entirety of a marker and hence to increase the forgery costs.

Figure 1:
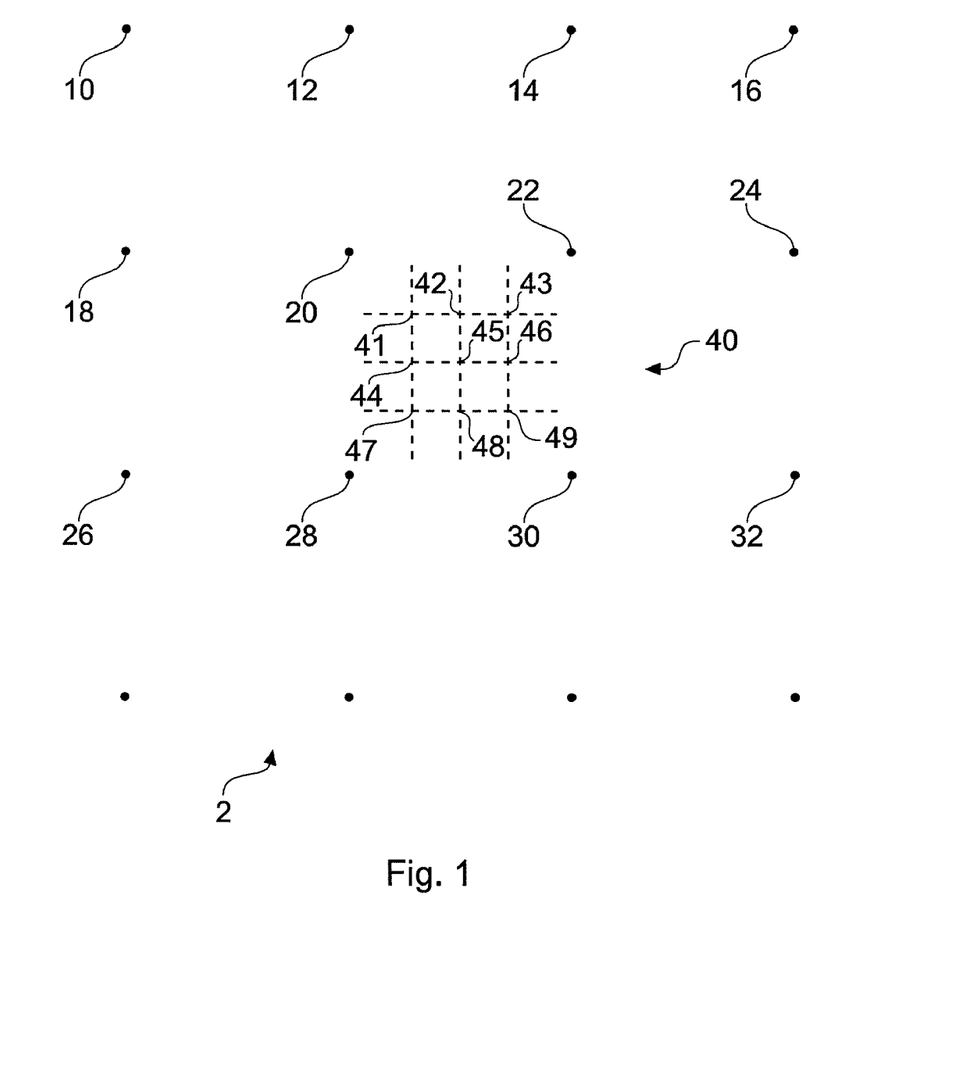
FIG. 1 schematically illustrates a coding pattern that is suitable for use within a printed security label.

FIG. 1 schematically illustrates a coding pattern (described in US2005/0093829, Shaked et al) that can be printed by conventional printing technology and which can be used to encode information. The coding pattern comprises a first array of pattern markers which, in this embodiment, is represented by a series of printed dots 10, 12, 14, 16, 18, 20, 22, 24, 26, 28, 30, 32 and so on which are arranged in a regular grid pattern. The grid pattern provides a reference grid which can be used by an imaging system in order to re-orientate, scale and/or normalise an image such that data can be extracted from the coding pattern irrespective of the orientation of the printed surface with respect to the imaging device, with the caveat that the imaging device needs to be able to image a sufficient area of the surface at sufficient quality in order to extract the coding pattern and the encoded information. Each of the dots within the coding grid can cooperate with its neighbours to form one or more squares. For simplicity dots 20, 22, 28 and 30 have only been considered and they form a square having an interstitial region 40 between the dots. It can be seen that the square can then be subdivided. In this example chain lines have been used to denote the one quarter, half-way and three quarter points along the squares sides and the chain lines intersect at positions 41, 42, 43, 44, 45, 46, 47, 48 and 49 which represent interstitial positions at which a further dot could be printed in order to encode a value. It can be seen that if only one dot is printed in any interstitial region of a square then the position of that dot can be easily determined with respect to the corners of the square by reference to the printed dots within the reference grid. It can be seen that in this coding scheme if we choose to omit the central position 45 then we can encode three bits of information. Thus position 41 could encode 000, position 42 could encode 001, position 43 could encode 010, position 44 can encode 011, position 46 can encode 100, position 47 can encode 101, position 48 can encode 110 and position 49 can encode 111. Each interstitial site can encode a different number and hence it is possible even when viewing only a relatively small number of squares to encode a significant amount of data. In fact, it can be seen that a view area of only 5×5 squares could encode 75 bits of information. This much information can be used to designate a nominally unique number which could be product or batch specific to identify a single product from a manufacturing process or to enable a single batch from a manufacturing process to be identified. There is also sufficient space within the "data payload" that can be viewed by the camera in order to include positional information to identify which portion of the grid pattern of the security marker that the camera is imaging. Consequently, the printing of a relatively high density pattern comprising a reference grid and data represented by the position of a printed item within the interstitial areas of the reference grid provides a security identifier which is difficult to fake because of the amount of data carried on it. This is particularly relevant when the grid is printed by a high quality industrial printing process such as liquid electrostatic printing where a well defined dot can be deposited on a substrate with the dot diameter controllable in small increments of around 10 microns. Such printers can theoretically achieve a resolution in excess of 3200 dots per inch and hence the printer dot placement is also statistically accurate to within 8 microns.

Thus, when using high quality variable data printing processes of this type a security algorithm can be used to drive the printer such that each product, or a batch of a product, has a unique code containing some parameters which were generated in accordance with a pseudo-random sequence such that very few individuals or organisations could have access to the sequence and hence, from an outsiders perspective, the sequence cannot be predicted. Also these digital industrial printers are unique to a small number of manufacturers thus it is possible to envisage by joint agreement, algorithms that are embedded in the data pipeline that controls the printer and that could be used to detect the printing of such a specific security pattern. Following detection authorisation would be required in order to create the printed pattern.

The codes can then be looked up in a data store, such as a database to verify if they are real codes, or if they have been faked.

Whilst this in itself provides a security feature which is relatively inexpensive for a bona fide manufacturer to introduce, but expensive for a forger to reproduce, the inventors realised that the further enhancements to security could be provided.

Figure 2A:
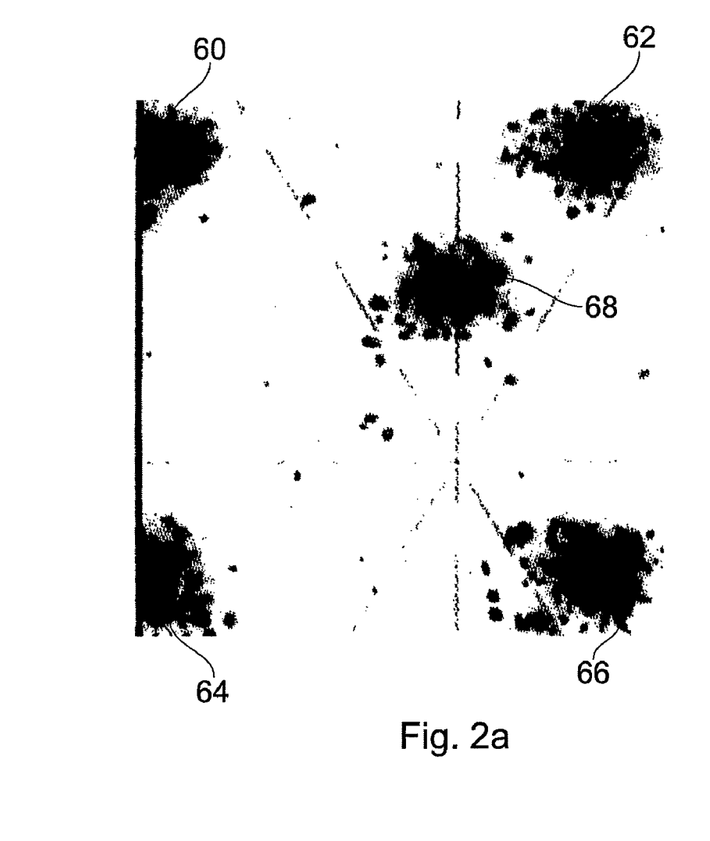
FIG. 2a is a highly magnified view of laser jet marks.

In reality, physical printing processes tend to be imperfect. These imperfections can be regarded as artefacts of the printing process. FIG. 2a is an image of real dot pattern in accordance with the embodiment shown in FIG. 1 when printed using a laser (dry toner electrostatic) printer. The regions 60, 62, 64 and 66 represent the dots forming part of the reference grid, whereas regions 68 represents a data carrying dot. It can be seen that each dot is in fact surrounded by parasitic or random splutters of toner such that when viewed at this resolution each dot is far from ideal, is essentially random in nature and hence any printing process seeking to print nominally the same image will, at this resolution, contain sufficient differences such that each printed pattern is unique, even if to the naked eye thousands of printed patterns are notionally identical.

Figure 2B:
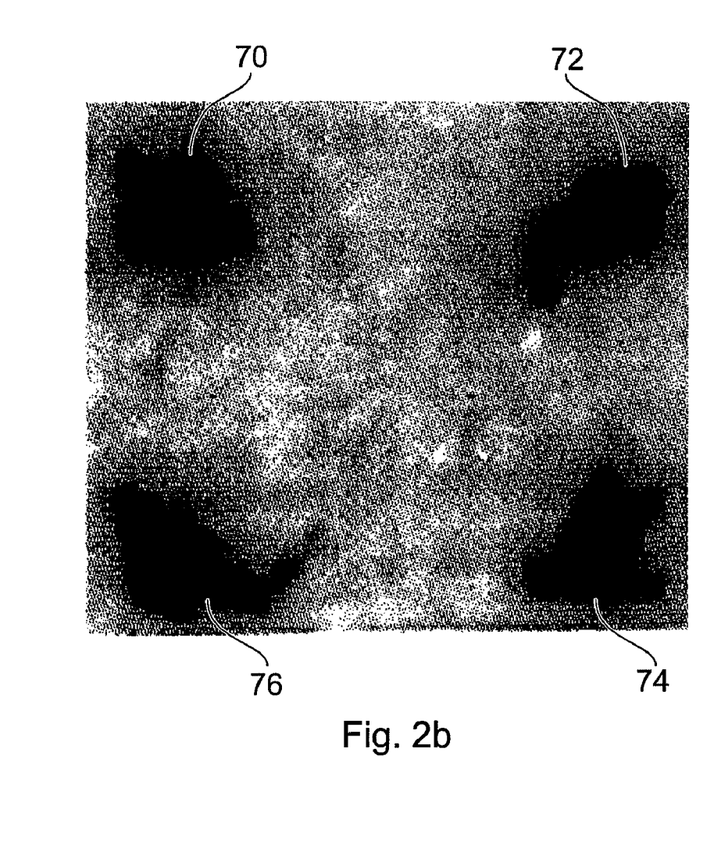
FIG. 2b is a highly magnified view of ink jet marks.

FIG. 2b illustrates an ink jet printed pattern, this time with regions 70, 72, 74 and 76 showing only the positions of the reference grid. Each ink jet dot has a non-ideal, and random, shape resulting from various artefacts of the ink jet printing process, for example when the ink jet is ejected from the nozzle it tends to form a "teardrop" shape and the fact that the ink head is moving relative to the substrate that will be printed means that this teardrop shape is generally imparted onto the substrate. However, we then also have irregularities in the substrate surface and the kinetic energy of the ink drop to dissipate which means that the ink spreads in an unpredictable fashion, on a micro-scale, when it lands on the substrate. Thus, at this resolution, each printed pattern is unique even if when viewed to the naked eye thousands of printed patterns are nominally identical. The inventors realised that this micro scale (i.e. the features occur on a scale of tens or hundreds of μm) randomisation of the ink distribution from a printer could also be used in combination with the data bearing grid pattern to provide a highly secure authentication system.

In an embodiment of the present invention the security image, once printed, is scanned by a scanner to record an image of it at sufficiently high resolution to identify micro scale artefacts in the printed image such that a comparison can be made between the image as recorded by the manufacturer in a database or other searchable data repository, and the image as read by a scanner when seeking to authenticate the provenance of the item or product, or packaging presented to the scanner.

Figure 3:
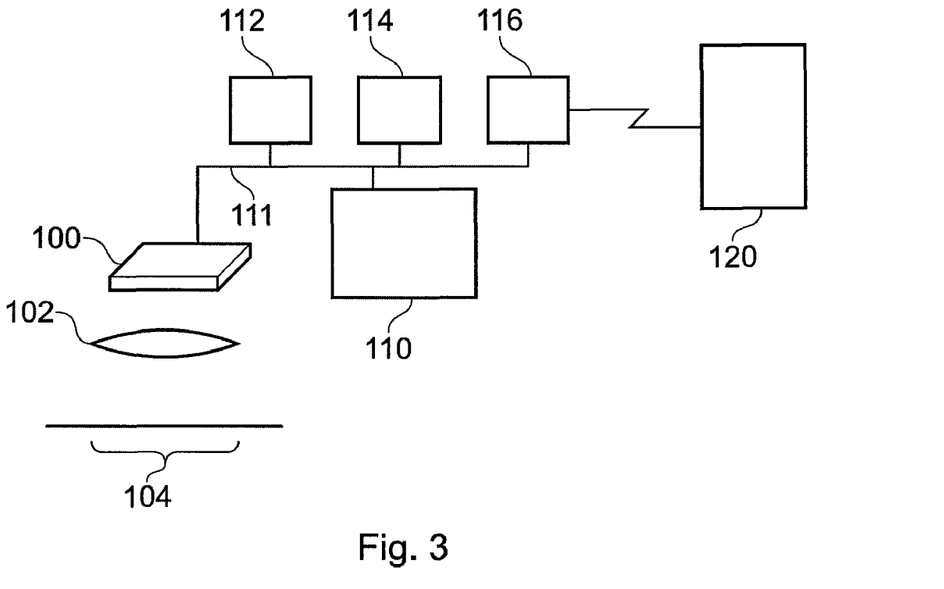
FIG. 3 schematically illustrates an authentication system constituting an embodiment of the present invention.

FIG. 3 schematically illustrates a security system constituting an embodiment of the present invention. A surface scanner, for example comprising a CMOS image sensor 100 in combination with the lens 102 that is used to form an image of a portion 104 of security mark as printed on a substrate. The CMOS image sensor is in communication with a data processor 110 via a databus 111. The databus 110 is also in communication with a memory 112, a human/machine interface 114 such as a display device which may be a touch screen so as to provide both input and output functionality, and a communications device 116 so as to establish communications with a database server 120. The communications device 116 can use any one or more suitable technologies which, without limitation include wired connection to the telephone or internet servers, wireless connection to an internet service or a combination of these two by any suitable implementing technology available at the time to the skilled person.

In use the scanner of FIG. 3 is brought into contact with a document, an item or its packaging in order to read the security label thereon. The document, item or packaging may be part of or surround any high valued product where the manufacturer seeks to avoid counterfeiting.

The blister pack for a pharmaceutical typically has a foil layer holding the drugs within the individual blisters of the packaging. Such a blister pack is schematically shown, when viewed from the under side, in FIG. 4a. The foil, generally designated 140 may have printed on it a security image 150 which is presented to the scanner. The scanner's field of view as defined by the CMOS image sensor 100 and lens 102 is only a small sub portion of the entirety of the security label. For example, as schematically represented by the region 152 in FIG. 4b. Region 152 can occur anywhere within the area of the security image 150.

Figure 4A:
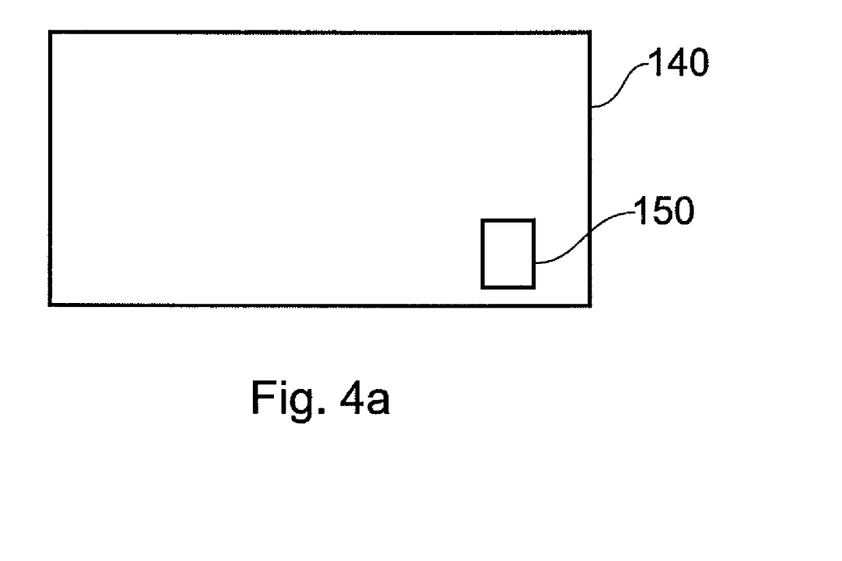
FIGS. 4a and 4b schematically illustrate a first modified coding scheme constituting an embodiment of the present invention.
Figure 4B:
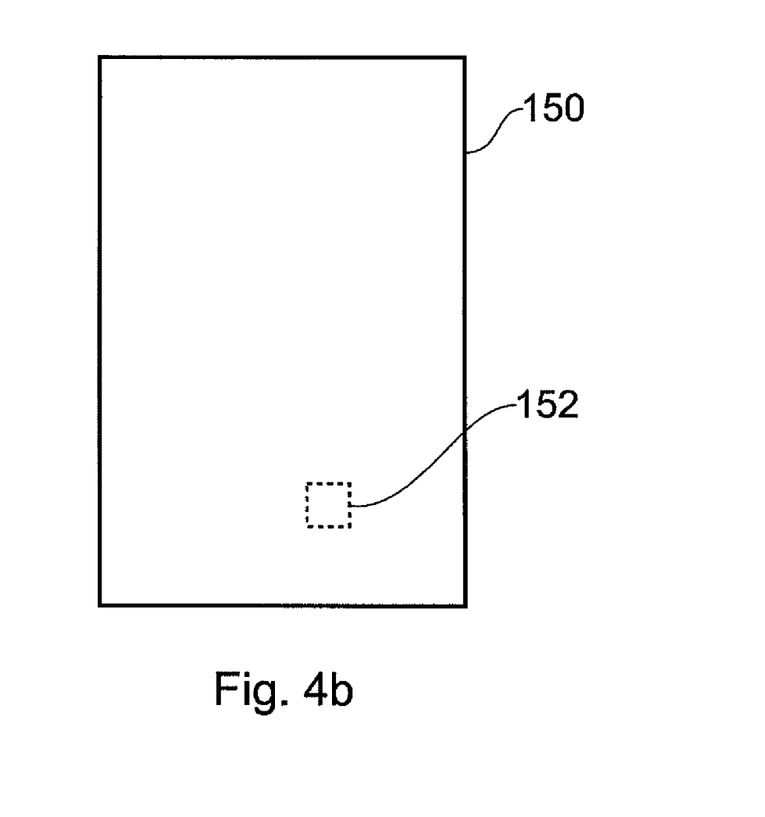

The data processor reads the image from the CMOS image sensor and stores it temporarily within memory 112. The data processor then executes a search process in order to identify the dots forming the alignment grid. As these are notionally equally spaced then these are relatively easy to detect and search algorithms for achieving this are already known. This process also allows non perpendicular imaging of the security marker 150 to be tolerated. Any imaging away from the perpendicular ideal will result in the separation of the dots within the security grid changing slightly due to perspective. The data processor can remap the acquired image to form a normalised image taking account of perspective correction and optionally shrinkage or expansion of the printed marker 150 as a result of changes to the substrate (for example paper changes size depending on the moisture content of its environment). Once the reference grid has been identified the image can then be analysed in order to extract the encoded data. This data is printed at sufficient density such that any given area 152 contains sufficient data to provide a unique identification number and an indication of the position of the area 152 within the security image 150. This information can then be passed to the database 120 via the communications device in order to facilitate the rapid look up within the database to check whether the identification number is valid. A check of validity may include whether the identification number exists and depending on the nature of the checking whether the identification number has been presented to the database before.

It can be seen that the reader may also be adapted to include information about itself and its owner. Thus in the supply chain the reader may be used to identify each entity handling the goods, together with an indication of the process that they are performing, for example receiving goods from a previous entity within the supply chain, stock checking them or preparing them for transport to a succeeding entity. In such an arrangement a security check for a single product may be made many times. However, when the product reaches a retailer then it is to be expected that it will be retailed only once. Therefore, if multiple retailers, or indeed the same retailer, sells a product having the same unique identity more than once then it can be inferred that at least one of these sales related to a fake product.

The manufacturer can then take whatever steps they deem appropriate. This might include contacting all individuals who have bought the product bearing the unique identity to identify which one is the counterfeit or in order to replace the product with ones from a bona fide source.

Optionally, the data processor 110 may transmit the image from the CMOS image sensor 100 to the database 120. This can be used to offload the data processing within the data processor 110 to the database 120, either such that the database 120 performs the analysis of the image to extract the unique identity and positional information, or such that the database 120 can then compare the actual pattern scanned by the CMOS image sensor 100 with the relevant portion of the printed pattern as scanned as part of the manufacturing process such that a comparison of the micro scale artefacts can also be made in order to provide a greater level of security. As a further alternative, the image may be retrieved from the database and downloaded to the reader such that the reader can perform the same task. As a result of the comparison, and/or merely the database look up, an indication may be given via the man machine interface 114 to indicate either that the product is believed to be "good", i.e. not a counterfeit or that the product is believed to be "bad", because some security breach has been detected and that the provenance of the product cannot be authenticated with a sufficient degree of certainty.

Figure 5:
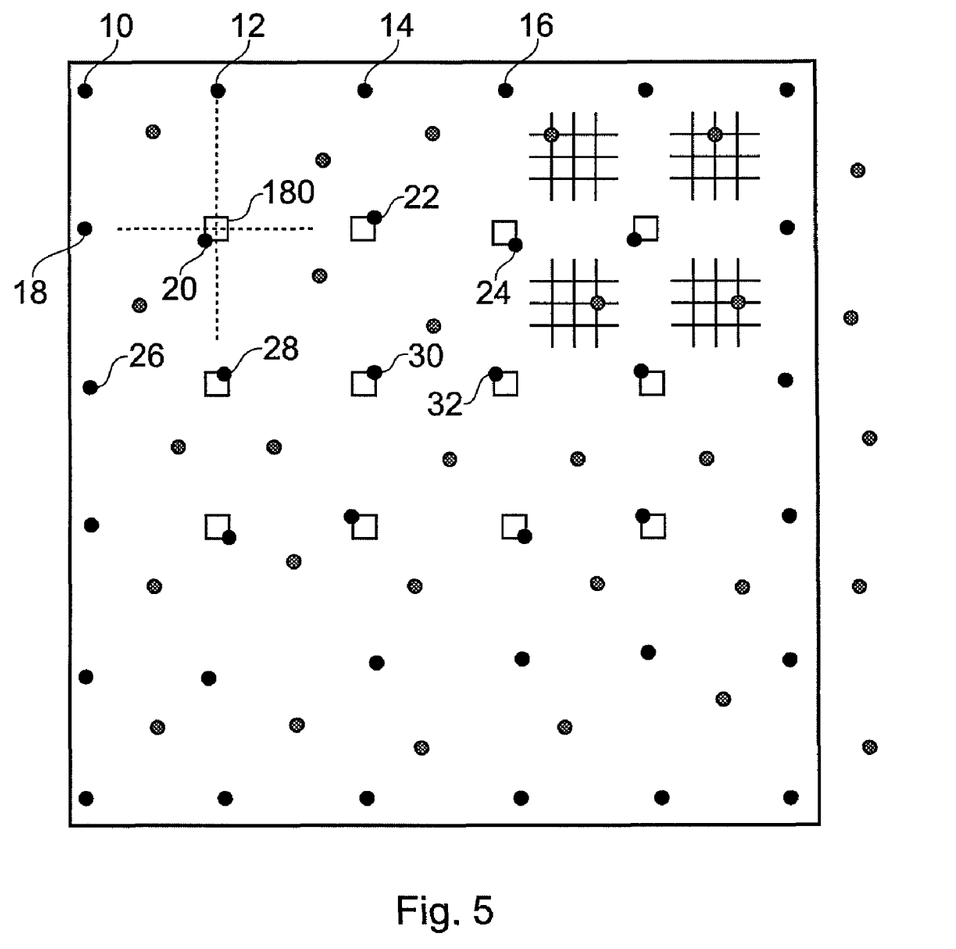
FIG. 5 schematically illustrates a second modified coding scheme constituting an embodiment of the present invention.

In a further embodiment of the present invention, and one of which is particularly suited for use with higher resolution printers, the positions of the individual dots within the reference grid may also be varied to encode data. However, given that the reference grid must still perform its reference function, then the variation in position of the dots therein has to be more tightly constrained. FIG. 5 illustrates a portion of a grid constituting an embodiment of the present invention. Here some of the reference grid dots, for example, 20, 22, 24, 28, 30 and 32 have been allowed to move away from their nominal positions by a small amount, so to lie on any one of the corners of a notional square 180 centred about the notional "correct" position of the dot if it were correctly aligned with the reference grid. Thus, each of these displaced reference dots can encode another two bits of information.

Each and every dot within the reference grid could be allowed to move from its notional position. However, for simplicity, the reference grid can be broken down into sub-portions such that every now and again, for example every 5 rows and columns within the grid, the reference dots are printed onto their correct positions within the grid so as to simplify the task of identifying the reference grid. The CMOS image sensor 100 and lens 102 of the reader need to then be arranged to be able to image sufficient of the grid in order to extract information from the dot pattern within the reference grid as well as information from the dots within the interstitial sides 40. This technique can be used with high resolution printers, such as liquid electrostatic printers where printing artefacts are rare, so as to provide a system where the printed image does not itself need to be recorded during the manufacturing process because it can be assumed to be nearly perfect, but where the actual image is printed is highly complex thereby rendering it difficult to forge. This process can also be used with printing processes which do exhibit artefacts, such as inkjet and laser printing where an image of the printed surface may be scanned and stored in the database in order to provide enhanced checking of the recorded image by virtue of comparing the recorded micro scale artefacts with those imaged by a reader during an authentication or validation step.

Figure 6:
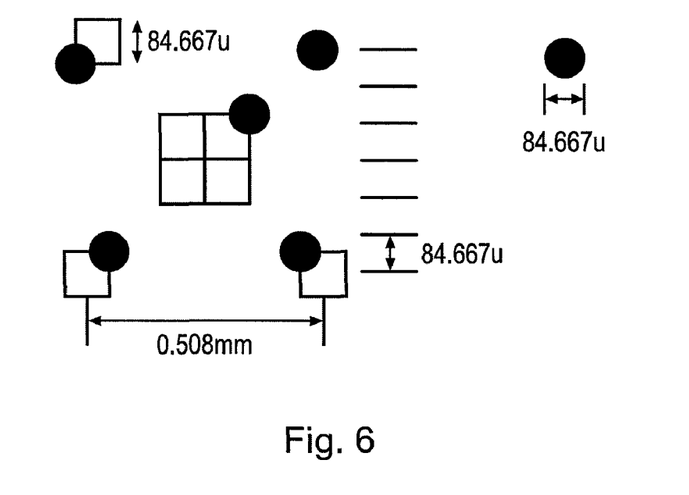
FIG. 6 illustrates a further coding scheme constituting an embodiment of the invention.

FIG. 6 schematically illustrates a further printing scheme with which the dots within the reference grid can be displaced to one of four corners at the square centred on their notional correct positions, and where the dots in the interstitial site can still be moved to any one of nine positions so as to encode the data therein. In an exemplary embodiment of the present invention the dots in the coding grid are nominally spaced by 0.508 mm (although of course other separations can be used), and the displacement of the dot within the coding grid from its nominally correct position corresponds to the dot diameter, which in this example is approximately 84 micrometres.

It is thus possible to provide a security system where relatively inexpensive and readily available printing techniques can be used to produce a highly secure label whose authenticity can be validated by reference to a database. The system has the advantage of using a complex and therefore difficult to forge label whilst also reducing the amount of data which needs to be captured in order to perform a database query. This in itself enables the database query to be performed relatively quickly. Thus, users will not be tempted to simply ignore the security system because of the query time overhead.

It would be technically feasible to perform a database query merely by presenting the scanned image to the database. However, for each and every label held in the database, the database would then have to perform an image check over the entirety of that label. For any product having significant volume this would result in a disproportionately long and inefficient query process. However, by encoding at least one of positional information or batch number or product identity information then the database query can be significantly reduced. Thus, if each product has a unique label then the database need only examine one label within its memory rather than each and every possible label. If the database query contains positional information then the database only has to examine the correct position of each label within its memory. However, if both positional and identity information is provided then the database only has to examine a small portion of one label within its memory and hence the query time is dramatically and significantly reduced.

It is also possible for the printed label to be only an extract of a much larger label. Each printed label would correspond to a different part of the larger "logical" label. A scan could then identify the portion of the larger logical label that had been presented to the scanner and then a look up could be made to determine what this printed label had been applied to. The logical label could be vastly bigger than the printed portions and each portion that gets printed can be allocated to any use that a person having rights to print that portion wished to use it for. Thus, positional information can be sufficient to act as a key to enable a unique product identifier, batch identifier or the like to be looked up by reference the position range encoded within the label.

The invention claimed is:

1. A method of authenticating the identity of an item associated with a printed security marker, the method comprising:
   a. printing the security marker with a pattern that encodes at least one of a unique product identifier, a batch identifier, and positional information about a portion of the marker;
   b. scanning and storing an image of the security marker as printed, said image being taken at sufficiently high resolution to capture artefacts of the printing process;
and authentication steps comprising:
   c. imaging a portion of the marker at sufficiently high resolution to capture the artefacts, and
   d. querying a data store by providing the image of the portion of the marker or a compressed or parameterised version of the image and data derived from the pattern.

2. A method claimed in claim 1 in which the embedded pattern comprises a reference pattern defining positions for data bearing regions and spatially encoded data within the data bearing regions.

3. A method as claimed in claim 2 in which the positions of markers within the reference pattern can be varied so as to encode data in the reference pattern.

4. A method as claimed in any of the preceding claims in which the printing artefacts that are recorded include toner splatter, formation of tails from inkjets, shape, diameter/size and deposition errors resulting from surface texture and composition of the substrate.

5. A method as claimed in any of the preceding claims where the batch number or unique identifier and the positional data are sent to the data store so as to reduce the query overhead to the data store.

6. A method as claimed in any one of the preceding claims in which the data from the data store is compared with the image of the portion of the marker and an assessment is made as to the authenticity of the marker.

7. A method as claimed in any one of the preceding claims in which the security marker is printed onto product packaging.

8. A method as claimed in any one of claims 1 to 6 in which the security marker is printed on to a product.

9. A method as claimed in any one of the preceding claims in which the security marker is printed in combination with a bar code.

10. A method as claimed in claim 1, in which the data store is a data base.

11. An authentication system as claimed in claim 10 in which the reader and data store communicate with one another via a telecommunications link.

12. A method of authenticating an item where the item has been printed with a security marker comprising a pattern that encodes positional information so as to identify one sub-portion of the marker from other portions of the marker, and which also encodes an identifier, and wherein the marker is read by a reader which captures an image of the indentified sub-portion of the marker along with artefacts of the printing process associated with that sub-portion of the marker, the data from the reader is processed to extract the identifier, the positional information, and the artefacts, and a data store is interrogated to check the integrity of the marker.

13. A method as claimed in claim 12, in which the identifier is a batch identifier.

14. A method is claimed in claim 12, in which the identifier is a unique identifier.

15. A method as claimed in any of claim 12, in which the data store indicates whether the marker exists in its entries.

16. A method as claimed in claim 12, in which the data store checks whether the marker has been previously presented to the data store.

17. A method as claimed in claim 12, in which the positions of the markers at printing are known to within 10 µm.

18. A method as claimed in claim 17, in which the positions of the markers are known to within 5 µm.

19. A method as claimed in a claim 12, in which the data in the data store represents the ideal marker positions.

20. A method as claimed in claim 12, in which the data in the data store represents the marker positions as measured by an imaging device.

21. A method as claimed in claim 12, in which the data store is a data base.

22. An authentication system comprising a reader and a data store, wherein the reader images a portion of a security marker, the portion of the security marker containing spatially encoded data enabling the portion of the marker to be identified and an identity encoded within the marker to be identified, and wherein data from the image is presented to a data store which compares the data from the reader with data in the data store so as to give an indication about the authenticity of the security marker.

* * * * *

UNITED STATES PATENT AND TRADEMARK OFFICE
CERTIFICATE OF CORRECTION

| | | |
|---|---|---|
| PATENT NO. | : 8,045,753 B2 | Page 1 of 1 |
| APPLICATION NO. | : 11/959848 | |
| DATED | : October 25, 2011 | |
| INVENTOR(S) | : Guy Adams et al. | |

It is certified that error appears in the above-identified patent and that said Letters Patent is hereby corrected as shown below:

In column 8, line 6, in Claim 2, after "method" insert -- as --.

In column 8, line 13, in Claim 4, delete "any of the preceding claims" and insert -- claim 1, --, therefor.

In column 8, line 18, in Claim 5, delete "any of the preceding claims" and insert -- claim 1, --, therefor.

In column 8, line 22, in Claim 6, delete "any one of the preceding claims" and insert -- claim 1, --, therefor.

In column 8, line 26, in Claim 7, delete "any one of the preceding claims" and insert -- claim 1, --, therefor.

In column 8, line 29, in Claim 8, delete "any one of claims 1 to 6" and insert -- claim 1, --, therefor.

In column 8, line 31, in Claim 9, delete "any one of the preceding claims" and insert -- claim 1, --, therefor.

In column 8, line 52, in Claim 14, delete "is" and insert -- as --, therefor.

In column 8, line 54, in Claim 15, before "claim" delete "any of".

In column 8, line 63, in Claim 19, before "claim" delete "a".

Signed and Sealed this
Fourteenth Day of August, 2012

David J. Kappos
*Director of the United States Patent and Trademark Office*